Jan. 5, 1960
C. M. McKENZIE
2,919,738
ANTI-SKID DEVICE
Filed Oct. 28, 1957
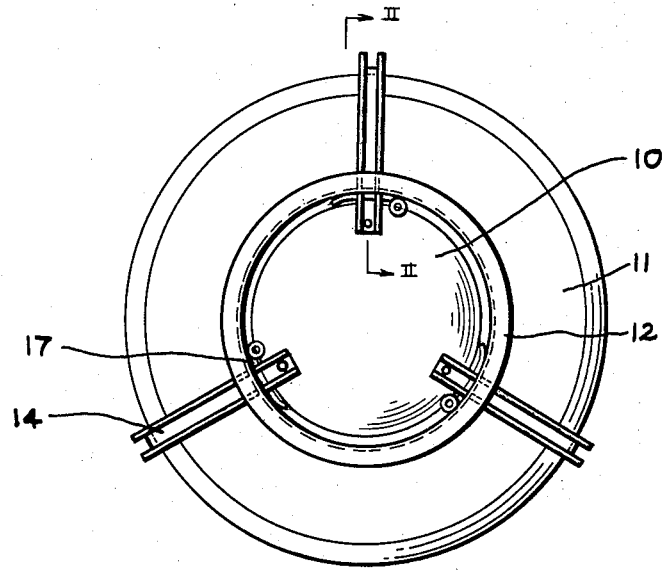
FIG. 1
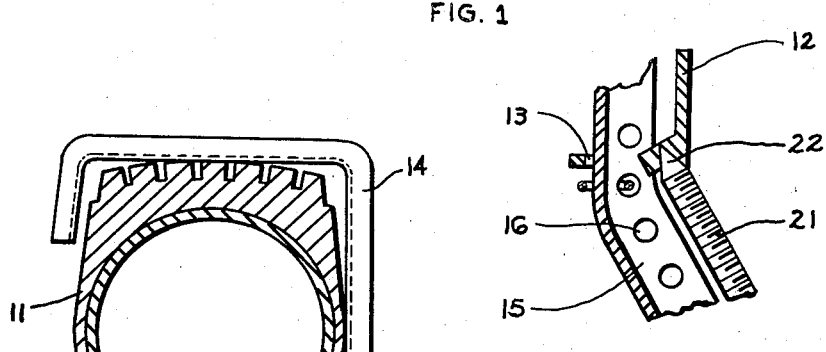
FIG. 3
FIG. 4
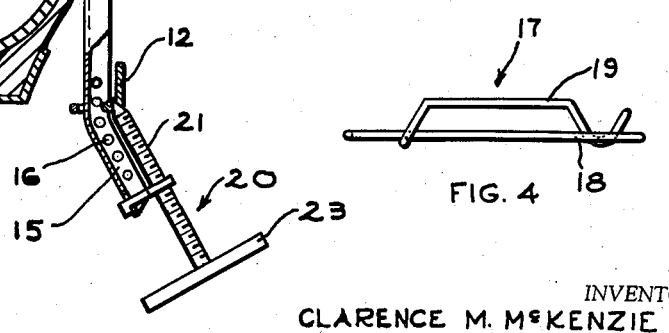
FIG. 2
INVENTOR
CLARENCE M. McKENZIE
BY *Francis J. Klempay*
ATTORNEY

United States Patent Office 2,919,738
Patented Jan. 5, 1960

2,919,738

ANTI-SKID DEVICE

Clarence M. McKenzie, Canfield, Ohio

Application October 28, 1957, Serial No. 692,596

1 Claim. (Cl. 152—228)

This invention relates to a device for attachment to the driving wheels of a motor vehicle to increase the traction thereof and permit the vehicle to move in snow, ice or mud. The device is designed primarily for emergency use under adverse road conditions and is characterized by its ease of attachment to the wheels of the vehicle even when the same is deeply mired in mud or snow, for example.

The primary object of the invention is the provision of a device for the purpose indicated and having the characteristic outlined above which is extremely simple in design, most economical to produce, and capable of being readily collapsed or nested for transportation in the trunk or tool compartment of the vehicle.

A further object of the invention is the provision of a device of the kind mentioned which is readily attachable to the vehicle wheel by manipulations taking place entirely in the center area of the outside of the wheel. This eliminates any necessity for reaching around or under the tire when installing the device and thus is more apt to be used on more occasions since the installer need not soil his hands or clothes. This arrangement, further, eliminates any necessity for slits or apertures in the wheel rim and thus may be applied to any style or wheel. Also, the construction is such that the highly polished ornamental hub caps normally used on passenger vehicles at least are protected against scratching or other damage in the installation and use of the device.

The above and other objects and advantages of the invention will become apparent upon consideration of the following specification and the accompanying drawing wherein there is disclosed a preferred embodiment of the invention.

In the drawing:

Figure 1 is a side elevation of a vehicle wheel and tire fitted with the anti-skid device of my invention;

Figure 2 is a transverse sectional view taken along the line 11—11 of Figure 1 and showing an attaching appliance which is part of the invention;

Figure 3 is a fragmentary sectional view on an enlarged scale of a detail of the invention;

Figure 4 is a view of a clip used in the assembly of Figure 1.

In the drawing reference numeral 10 designates a vehicle wheel on which is mounted a tire 11. The device of the invention comprises a ring 12 preferably of steel and of cross section as shown in Figure 2 to provide strength and rigidity. The cylindrical portion of ring 12 is provided with at least three equally spaced apertures to slidably receive the shanks of the cleats 14 which are U-shaped as shown in Figure 2 to encompass the tread and a portion of the sidewalls of the tire so that the cleats are effectively restrained against lateral movement. The cleats 14 with integral shanks are preferably formed of a channel section of a hardenable steel and, as shown, the flanges of these cleats extend radially outward of the wheel to enhance the gripping power of the cleats.

The invention provides means to clamp the cleats in pressure contact with the periphery of the tire to prevent any spinning of the tire within the cleats and to firmly fasten the cleats to the tire. This is accomplished by providing a series of apertures 16 in the end portions of the shanks of the cleats so that after the cleats are drawn radially inward, the same may be locked in place by inserting a locking pin or clip such as shown at 17 in Figure 4 through certain of the apertures 16 radially inward of the cylindrical flange 13 of the ring 12. The clips 17 are each provided with a locking bar 18 and a spring-biased keeper 19 so that the clips will not fall out when in use. It should be obvious that the bars 18 will engage the inner periphery of the flange 13 to restrain radial outward movement of the cleats 14.

To draw the cleats 14 radially inward under pressure I provide an arrangement comprised of an aperture in the inner extremity of the shank of each of the cleats 14 as shown in Figure 1 to detachably receive a hook-like portion of a threaded nut through which extends the threaded shank 21 of a tool 20. Tool 20 has a handgrip portion 23 on its outer end and a tapered inner end portion 22 which is received in a detent formed in the metal of the ring 12 as shown in Figure 3. To facilitate manipulation of the tool 20 the inner end portions of the shanks of the cleats 14 are bent outwardly as shown.

It should be obvious that when attaching one of my devices having only three cleats that only one of the cleats must be drawn inwardly by the tool 20. The geometry of the assembly is such that by forcibly drawing inward only the top cleat in Figure 1, for example, the two bottom cleats will be automatically drawn into pressure engagement with the tread of the tire.

When it is desired to attach the device shown in the drawing to a tire the lower two cleats and ring 12 are first applied (with the locking pins 17 inserted) and thereafter the ring 12 is held in proper position with one hand while the other hand is used to pull down the top cleat as far as possible. Thereafter and while the ring is still being held, the tool 20 is applied by first inserting the hook-like extension of the nut aforesaid in the aperture at the bottom end of the shank and the top cleat after which the tool is rocked to bring the pointed end 22 into registry with the detent in ring 12. By rotating tool 20 in the proper direction the assembly is tightened and the top cleat is forcibly drawn down while the ring 12 is pushed up. Locking pin 17 is then inserted in the shank of the upper cleat after which the tool 20 may be loosened and removed.

It should now be apparent that I have provided an improved anti-skid device for vehicle wheels which accomplishes the objects and provides the advantages initially set out. Only four inexpensive principal parts are required for one wheel assembly and each of these are readily fabricated of conventional inexpensive stock. The ring acts as a reinforcement in holding the parts in properly spaced relation and resists the centrifugal force acting on the cleats when the wheel is spinning so that there is no danger of these cleats impinging against a fender or other parts of the vehicle to damage the same. The principal advantage of the invention, however, is the ease with which the anti-skid assemblies may be attached to and detached from the vehicle wheels even under very adverse road and weather conditions.

The above specifically described embodiment of the invention should be considered as illustrative only as obviously many changes may be made therein without departing from the spirit or scope of the invention. Reference should therefore be had to the appended claim in determining the scope of the invention.

I claim:

In an anti-skid attachment for a rubber-tired vehicle wheel of the kind having an apertured ring adapted to be disposed concentrically of the wheel on the outer face thereof, and a plurality of U-shaped cleats engageable over the tread of the tire and each having a shank receivable in an aperture in the ring, the improvement consisting of a series of apertures in said shanks spaced longitudinally therealong, a retractable locking pin for each of said shanks receivable in an aperture thereof inwardly of said ring to lock said cleats against radial outward movement, and means to tighten said cleats onto the tire comprising a screw having a handle at its outer end and an inner end adapted to detachably engage a recess formed in said ring, a nut having an outwardly projecting lug threaded on said screw, and means on the radially inner end of at least one of said shanks to detachably receive said lug, the arrangement being such that upon application of said screw and nut to said one of said shanks the same may be forceably drawn inwardly through the ring upon rotation of the screw after which one of the locking pins may be inserted in an aperture of the shank inwardly of the ring and the screw and nut then removed.

References Cited in the file of this patent
UNITED STATES PATENTS

| | | |
|---|---|---|
| 2,449,033 | Younglove | Sept. 7, 1948 |
| 2,746,508 | Doughty | May 22, 1956 |